United States Patent
Lin et al.

(10) Patent No.: US 10,665,142 B2
(45) Date of Patent: May 26, 2020

(54) SCREEN CALIBRATION METHOD AND SCREEN CALIBRATION SYSTEM CAPABLE OF CORRECTING FULL SCREEN COLOR TONES AUTOMATICALLY

(71) Applicant: BENQ CORPORATION, Taipei (TW)

(72) Inventors: Hsin-Nan Lin, Taipei (TW); Chung-Yu Huang, Taipei (TW)

(73) Assignee: BenQ Corporation, Taipei (TW)

( * ) Notice: Subject to any disclaimer, the term of this patent is extended or adjusted under 35 U.S.C. 154(b) by 0 days.

(21) Appl. No.: 16/247,604

(22) Filed: Jan. 15, 2019

(65) Prior Publication Data
US 2019/0228737 A1      Jul. 25, 2019

(30) Foreign Application Priority Data

Jan. 23, 2018   (CN) .......................... 2018 1 0065573

(51) Int. Cl.
*G09G 3/00*     (2006.01)
*G01J 3/50*     (2006.01)

(52) U.S. Cl.
CPC .............. *G09G 3/006* (2013.01); *G01J 3/506* (2013.01); *G09G 2320/04* (2013.01); *G09G 2320/0666* (2013.01); *G09G 2320/0693* (2013.01); *G09G 2320/08* (2013.01); *G09G 2340/06* (2013.01); *G09G 2360/145* (2013.01)

(58) Field of Classification Search
CPC .............. G09G 3/006; G09G 2320/08; G09G 2320/0666; G09G 2320/0693; G09G 2360/14; G09G 2360/145
See application file for complete search history.

(56) References Cited

U.S. PATENT DOCUMENTS

| | | | |
|---|---|---|---|
| 9,489,881 B2 * | 11/2016 | Yanagi | ...................... G09G 3/20 |
| 9,754,545 B2 * | 9/2017 | Han | ...................... G02F 1/1309 |
| 2007/0052735 A1 | 3/2007 | Chou | |
| 2013/0169700 A1 | 7/2013 | Park | |
| 2014/0168225 A1 * | 6/2014 | Ohwaki | ................. G09G 5/003 345/501 |

FOREIGN PATENT DOCUMENTS

| | | | |
|---|---|---|---|
| CN | 105679221 A | * | 6/2016 |
| CN | 106791759 A | | 5/2017 |
| TW | I280409 | | 5/2007 |

OTHER PUBLICATIONS

Tom Danielson et al., Advances in Iterative Non-uniformity Correction Techniques for Infrared Scene Projection, 2015, pp. 945210-1~945210-7, Proc. of SPIE vol. 9452, XP060052651.

* cited by examiner

*Primary Examiner* — Gene W Lee

(57) ABSTRACT

A screen calibration method includes acquiring a full screen image displayed on a screen by a camera, acquiring first optical data of a first region of the screen by a sensor, adjusting the first optical data of the first region of the screen according to first calibration parameters for calibrating colors of the first region to approach target optical data, generating second optical data of a second region of the screen according to the full screen image and the first optical data of the first region, generating second calibration parameters according to the target optical data and the second optical data, and adjusting the second optical data of the second region of the screen according to the second calibration parameters for calibrating colors of the second region to approach the target optical data.

20 Claims, 10 Drawing Sheets

| R1<br>(x1,y1,Y1) | R2<br>(x2',y2',Y2') ≈<br>(x2-△x1,y2 -△y1,Y2-△Y1) | R3<br>(x3',y3',Y3') ≈<br>(x3-△x1,y3 -△y1,Y3-△Y1) |
|---|---|---|
| R4<br>(x4',y4',Y4') ≈<br>(x4-△x1,y4 -△y1,Y4-△Y1) | R5<br>(x5',y5',Y5') ≈<br>(x5-△x1,y5 -△y1,Y5-△Y1) | R6<br>(x6',y6',Y6') ≈<br>(x6-△x1,y6 -△y1,Y6-△Y1) |
| R7<br>(x7',y7',Y7') ≈<br>(x7-△x1,y7 -△y1,Y7-△Y1) | R8<br>(x8',y8',Y8') ≈<br>(x8-△x1,y8 -△y1,Y8-△Y1) | R9<br>(x9',y9',Y9') ≈<br>(x9-△x1,y9 -△y1,Y9-△Y1) |

FIG. 5

| R1 (x, y, Y) | R2 ≈ (x, y, Y) | R3 ≈ (x, y, Y) |
|---|---|---|
| R4 ≈ (x, y, Y) | R5 ≈ (x, y, Y) | R6 ≈ (x, y, Y) |
| R7 ≈ (x, y, Y) | R8 ≈ (x, y, Y) | R9 ≈ (x, y, Y) |

FIG. 6

| R1 $(x1',y1',Y1') \approx$ $(x1-\triangle x5, y1-\triangle y5, Y1-\triangle Y5)$ | R2 $(x2',y2',Y2') \approx$ $(x2-\triangle x5, y2-\triangle y5, Y2-\triangle Y5)$ | R3 $(x3',y3',Y3') \approx$ $(x3-\triangle x5, y3-\triangle y5, Y3-\triangle Y5)$ |
|---|---|---|
| R4 $(x4',y4',Y4') \approx$ $(x4-\triangle x5, y4-\triangle y5, Y4-\triangle Y5)$ | R5 $(x, y, Y)$ | R6 $(x6',y6',Y6') \approx$ $(x6-\triangle x5, y6-\triangle y5, Y6-\triangle Y5)$ |
| R7 $(x7',y7',Y7') \approx$ $(x7-\triangle x5, y7-\triangle y5, Y7-\triangle Y5)$ | R8 $(x8',y8',Y8') \approx$ $(x8-\triangle x5, y8-\triangle y5, Y8-\triangle Y5)$ | R9 $(x9',y9',Y9') \approx$ $(x9-\triangle x5, y9-\triangle y5, Y9-\triangle Y5)$ |

FIG. 8

| R1 ≈ (x, y, Y) | R2 ≈ (x, y, Y) | R3 ≈ (x, y, Y) |
| --- | --- | --- |
| R4 ≈ (x, y, Y) | R5 (x, y, Y) | R6 ≈ (x, y, Y) |
| R7 ≈ (x, y, Y) | R8 ≈ (x, y, Y) | R9 ≈ (x, y, Y) |

FIG. 9

SCREEN CALIBRATION METHOD AND SCREEN CALIBRATION SYSTEM CAPABLE OF CORRECTING FULL SCREEN COLOR TONES AUTOMATICALLY

BACKGROUND OF THE INVENTION

1. Field of the Invention

The present invention illustrates a screen calibration method and a screen calibration system, and more particularly, a screen calibration method and a screen calibration system capable of correcting full screen color tones automatically.

2. Description of the Prior Art

Liquid crystal displays (LCD) and organic light emitting diode (OLED) devices have been widely used in our daily life because they take advantages of thin appearance, low power consumption and no radiation. For example, the LCD and OLED devices can be applied to multimedia players, mobile phones, personal digital assistants, computer monitors, or flat-screen TVs. However, when images are displayed on the screen, since their manufacturing processes and user configurations may be different, colors of the displayed images may be shifted. For example, some color offset effects including an offset of color tones, an offset of white balance, and an offset of color brightness may occur. Unfortunately, these color offset effects often cause unpleasant visual experience and severe color distortion of the displayed images.

When the color offset effects occur, a usual method for adjusting image colors is to open a function of "On-Screen-Display" in order to manually calibrate various parameters of the images displayed on the screen. Then, a user has to take a calibrator close to a small region of the screen. The calibrator can detect image colors of the small region of the screen. Therefore, the user can gradually adjust colors of a full screen image by taking the calibrator close to all small regions of the screen. However, for a general calibrator, since detection range of an optical sensor of the calibrator is limited, the calibrator can only detect optical characteristics of a single dot (i.e., or a small region) of the screen. In other words, for a large screen with high image definition, before a color calibration process of the full screen image is performed, the user has to collect entire optical characteristics of numerous regions of the screen by taking the calibrator close to all regions of the screen. However, collecting entire optical characteristics can be regarded as a repetition operation, thereby taking a lot of time. Further, since the operation of taking the calibrator close to all regions of the screen is manual, alignment error or offset may be introduced, leading to calibration accuracy degradation.

SUMMARY OF THE INVENTION

In an embodiment of the present invention, a screen calibration method is disclosed. The screen calibration method comprises acquiring a full screen image displayed on a screen by a camera, acquiring first optical data of a first region of the screen by a sensor, adjusting the first optical data of the first region of the screen according to first calibration parameters for calibrating colors of the first region to approach target optical data, generating second optical data of a second region of the screen according to the full screen image and the first optical data of the first region, generating second calibration parameters according to the target optical data and the second optical data, and adjusting the second optical data of the second region of the screen according to the second calibration parameters for calibrating colors of the second region to approach the target optical data.

In another embodiment of the present invention, a screen calibration system is disclosed. The screen calibration system comprises a screen, a camera, a sensor, and a processor. The screen comprises a plurality of regions for displaying an image. The camera is used for acquiring a full screen image of the screen. The sensor close to the screen is used for acquiring first optical data of a first region of the screen. The processor is coupled to the sensor, the camera, and the screen for calibrating the screen. After the sensor acquires the first optical data of the first region of the screen, the processor adjusts the first optical data of the first region of the screen according to first calibration parameters for calibrating colors of the first region to approach target optical data. The processor generates second optical data of a second region according to the full screen image and the first optical data of the first region. The processor generates second calibration parameters according to the target optical data and the second optical data. The processor adjusts the second optical data of the second region of the screen according to the second calibration parameters for calibrating colors of the second region to approach the target optical data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is an illustration of calibrating the darkest region of the screen and estimating real luminous characteristics of other regions by a processor of the screen calibration system in FIG. 1.

FIG. 6 is an illustration of calibrating other regions of the screen by the processor of the screen calibration system in FIG. 1 after the darkest region is calibrated.

FIG. 8 is an illustration of calibrating the center region of the screen and estimating real luminous characteristics of other regions by the processor of the screen calibration system in FIG. 1.

FIG. 9 is an illustration of calibrating other regions of the screen by the processor of the screen calibration system in FIG. 1 after the center region is calibrated.

DETAILED DESCRIPTION

Figure 1:
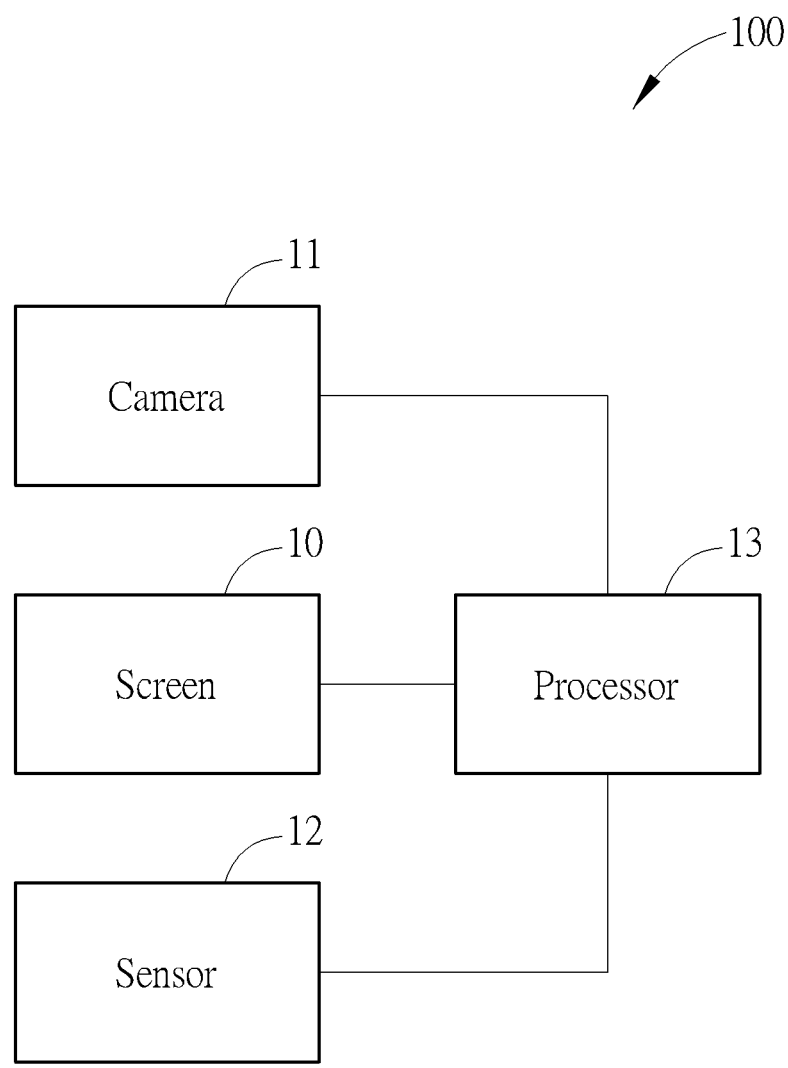
FIG. 1 is a block diagram of a screen calibration system according to an embodiment of the present invention.

FIG. 1 is a block diagram of a screen calibration system 100 according to an embodiment of the present invention. The screen calibration system includes a screen 10, a camera 11, a sensor 12, and a processor 13. The screen 10 includes a plurality of regions for displaying an image. In the embodiment, the screen 10 can be a screen of a liquid-crystal display (LCD), an organic light-emitting diode screen, or any screen device capable of generating optical signal. The plurality of regions of the screen 10 can be formed by a plurality of sub-pixel arrays. In the screen calibration system 100, the number of the regions, shapes of the regions, and sizes of the regions of the screen 10 are not limited. The camera 11 is used for acquiring a full screen image of the screen 10. The camera 11 can include a lens with a photo-sensitive component, such as a charge coupled device (CCD). Specifically, the lens can be designed as a wide-angle lens capable of capturing the full screen image of the screen 10. Therefore, when the camera 11 takes a picture on the screen 10, it can capture information of the full screen image. The sensor 12 close to the screen 10 is used for acquiring regional optical data. The sensor 12 can include any type of optical sensing device. When the screen 10 generates an optical signal for displaying the image, the sensor 12 can be used to get close to the screen 10 for acquiring optical data of a dot area or a small area of the screen 10. The processor 13 is coupled to the sensor 12, the camera 11, and the screen 10 for calibrating the screen 10. In the embodiment, a purpose of the screen calibration system 100 is to calibrate entire display range of the screen 10 according to the full screen image captured by the camera 11 and the optical data of the dot area or small area acquired by the sensor 12. Particularly, it is expected that colors of the entire display range of the screen 10 can be calibrated to approach target optical data set by the user. For this purpose, the sensor 12 can acquire first optical data of the first region of the plurality of regions of the screen 10. The processor 13 can adjust the first optical data of the first region of the screen 10 according to first calibration parameters for calibrating colors of the first region to approach the target optical data. Further, the processor 13 can generate second optical data of a second region according to the full screen image and the first optical data of the first region. Then, the processor 13 can generate second calibration parameters according to the target optical data and the second optical data. Finally, the processor 13 can adjust the second optical data of the second region of the screen 10 according to the second calibration parameters for calibrating colors of the second region to approach the target optical data. In the following, several embodiments are introduced to illustrate operations of the screen calibration system 100 and calibration methods.

Figure 2A:
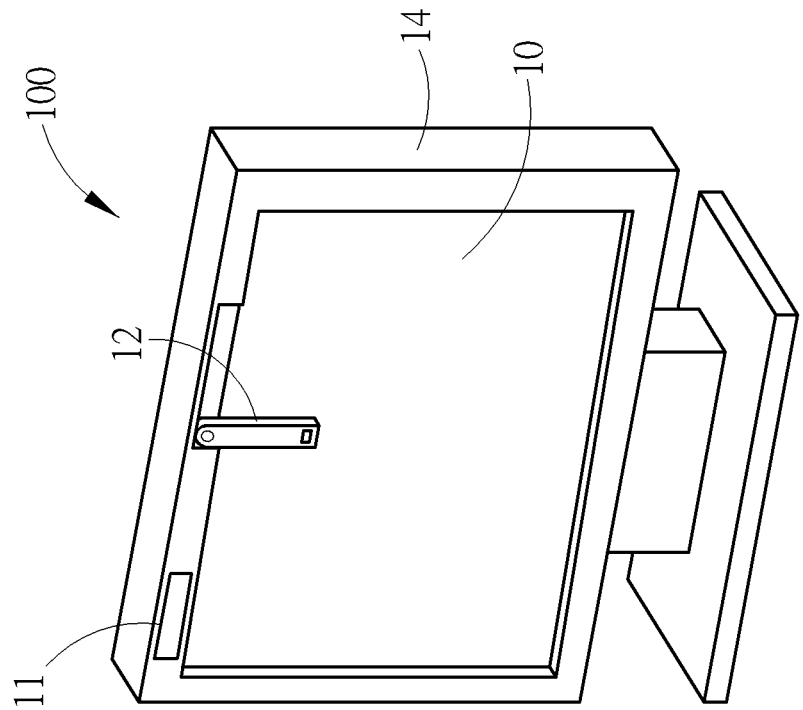
FIG. 2A is an illustration of a display device integrated by a screen, a camera, and a sensor of the screen calibration system in FIG. 1 when a displayed image is to be detected.
Figure 2B:
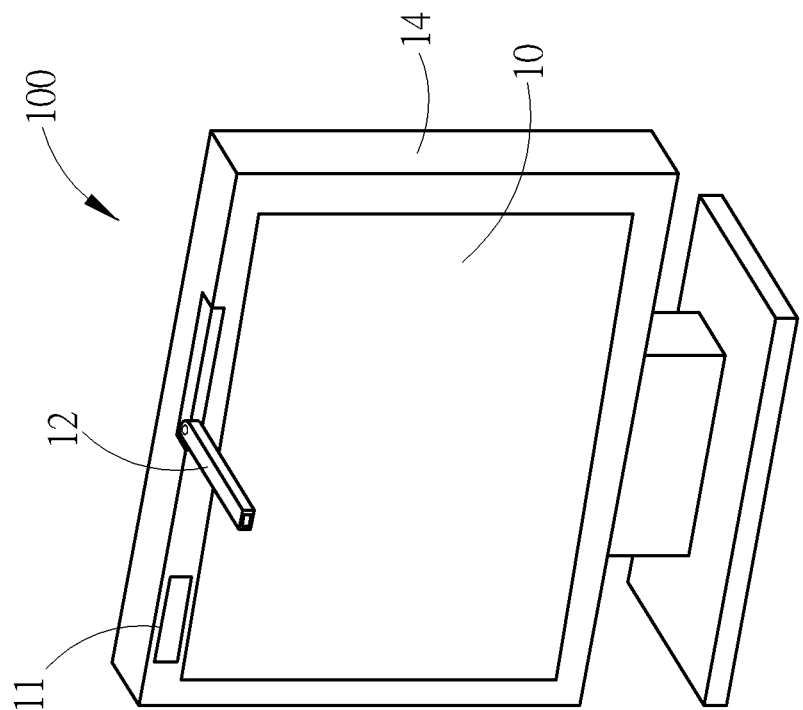
FIG. 2B is an illustration of the display device integrated by the screen, the camera, and the sensor of the screen calibration system in FIG. 1 when a detection of the displayed image is in progress.

FIG. 2A is an illustration of a display device 14 integrated by the screen 10, the camera 11 and the sensor 12 of the screen calibration system 100 when a displayed image is to be detected. FIG. 2B is an illustration of the display device integrated by the screen 10, the camera 11, and the sensor 12 of the screen calibration system 100 when a detection of the displayed image is in progress. In the screen calibration system 100, as shown in FIG. 2A and FIG. 2B, the camera 11, the sensor 12, and the screen 10 can be disposed on a housing of the display device 14. However, the camera 11 and the sensor 12 can be two separated components from the display device 14 and can communicate data by using a wireless link. Any reasonable hardware modification falls into the scope of the present invention. In FIG. 2A and FIG. 2B, the sensor 12 can be rotated to a position close to the first region of the screen 10 by using at least one bearing for acquiring the first optical data. The camera 11 can be rotated to a front of the screen 10 by using at least one bearing for acquiring the full screen image. However, the sensor 12 can be moved to a specific area of the screen 10 by using any method. For example, a multi-articulated support can be used for moving the sensor 12 to the specific area of the screen 10. The camera 11 can also be moved to an appropriate position by using a slide rail device or a flexible connection device for capturing the full screen image.

Figure 3:
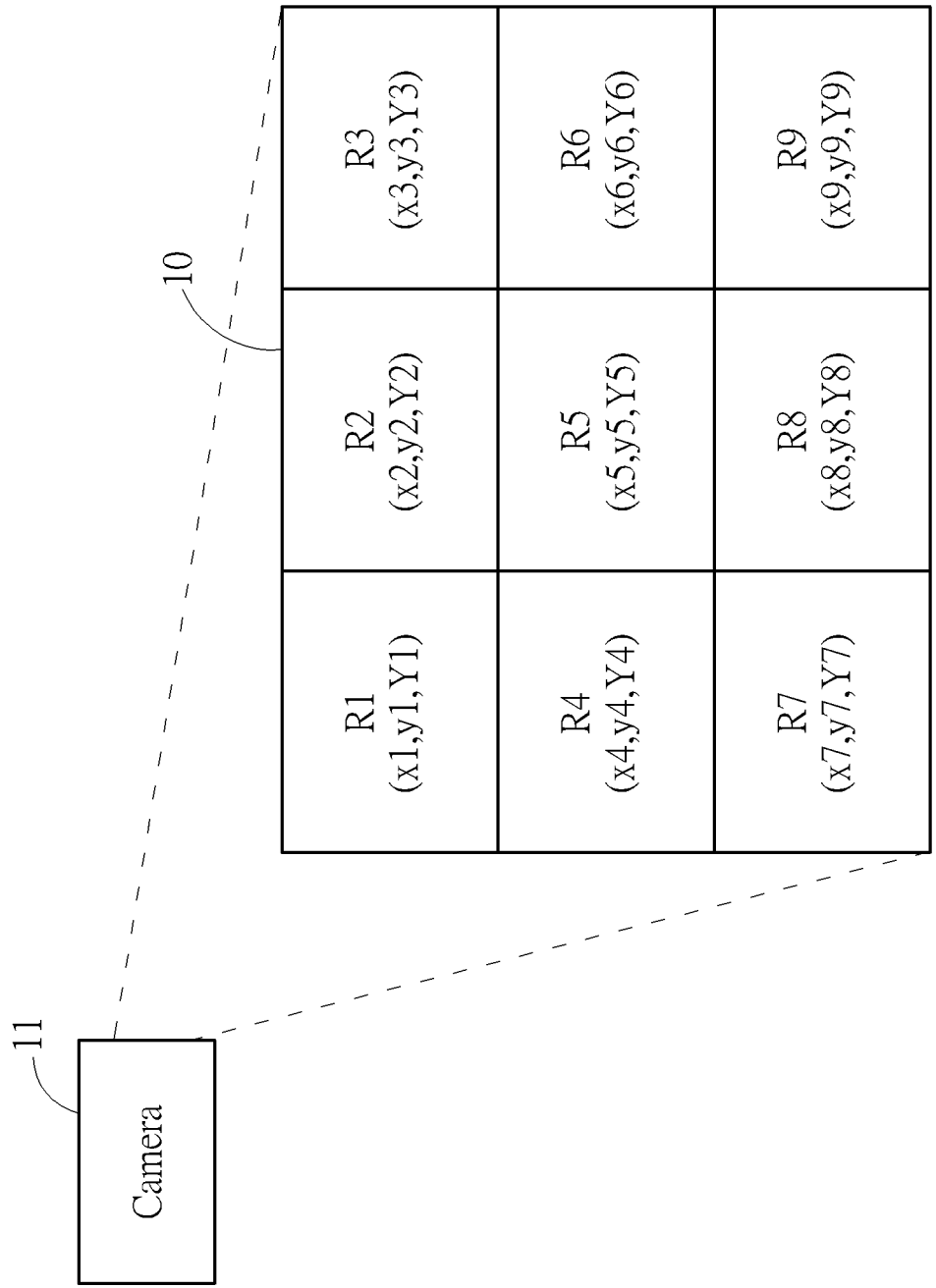
FIG. 3 is an illustration of capturing a full screen image by the camera of the screen calibration system in FIG. 1.

FIG. 3 is an illustration of capturing the full screen image by the camera 11 of the screen calibration system 100. As previously mentioned, the screen 10 can generate the optical signal. The screen 10 can be partitioned into the plurality of regions virtually. For example, the screen 10 can be partitioned into a region R1 to a region R9. Since the region R1 to the region R9 are allocated on different positions of the screen 10, optical characteristics of the region R1 to region R9 are also different. Further, since the camera 11 has to be moved to the appropriate position for capturing the full screen image, a gap between the camera 11 and the screen 10 is introduced. The gap can be regarded as a focal length of the camera 11 for capturing the full screen image displayed on the screen 10. Since the focal length is introduced between the camera 11 and the screen 10, an ambient light signal may interfere with each region of the full screen image captured by the camera 11. For convenience, the international commission on illumination (CIE) color space (i.e., CIE 1931 three-dimensional color space) can be used for illustrating a format of the optical data. However, the present invention is not limited by using CIE color space as the format for calibrating the displayed image. For example, a primary color (RGB) space can be used as the format for converting or projecting optical data of a color domain to another color domain for calibrating the displayed image. As previously mentioned, the ambient light signal may interfere with each region of the full screen image. Therefore, in the full screen image captured by the camera 11, image optical data of a region R1 on the screen 10 can be written as $(x1, y1, Y1)$. Equivalently, the image optical data $(x1, y1, Y1)$ can be expressed as:

$$(x1, y1, Y1) = (x1' + \Delta x1, y1' + \Delta y1, Y1' + \Delta Y1).$$

$(x1', y1', Y1')$ are denoted as real luminous characteristics of the region R1. $(\Delta x1, \Delta y1, \Delta Y1)$ are denoted as ambient light parameters of the region R1. In other words, the image optical data $(x1, y1, Y1)$ of the region R1 acquired by the camera 11 can be regarded as a combination of the real luminous characteristics $(x1', y1', Y1')$ with the ambient light parameters $(\Delta x1, \Delta y1, \Delta Y1)$. Similarly, in the full screen image captured by the camera 11, image optical data of a region R2 on the screen 10 can be written as $(x2, y2, Y2)$. Further, the image optical data $(x2, y2, Y2)$ can be expressed as:

$$(x2, y2, Y2) = (x2' + \Delta x2, y2' + \Delta y2, Y2' + \Delta Y2).$$

Here, $(x2', y2', Y2')$ are denoted as real luminous characteristics of the region R2. $(\Delta x2, \Delta y2, \Delta Y2)$ are denoted as ambient light parameters of the region R2. In other words, image optical data $(x2, y2, Y2)$ of the region R2 acquired by the camera 11 can be regarded as a combination of the real luminous characteristics $(x2', y2', Y2')$ with the ambient light parameters $(\Delta x2, \Delta y2, \Delta Y2)$, and so on. After the ambient light signal is introduced, the image optical data of the region R1 to the image optical data of the region R9 can be denoted as (x1,y1,Y1) to (x9,y9,Y9).

Figure 4:
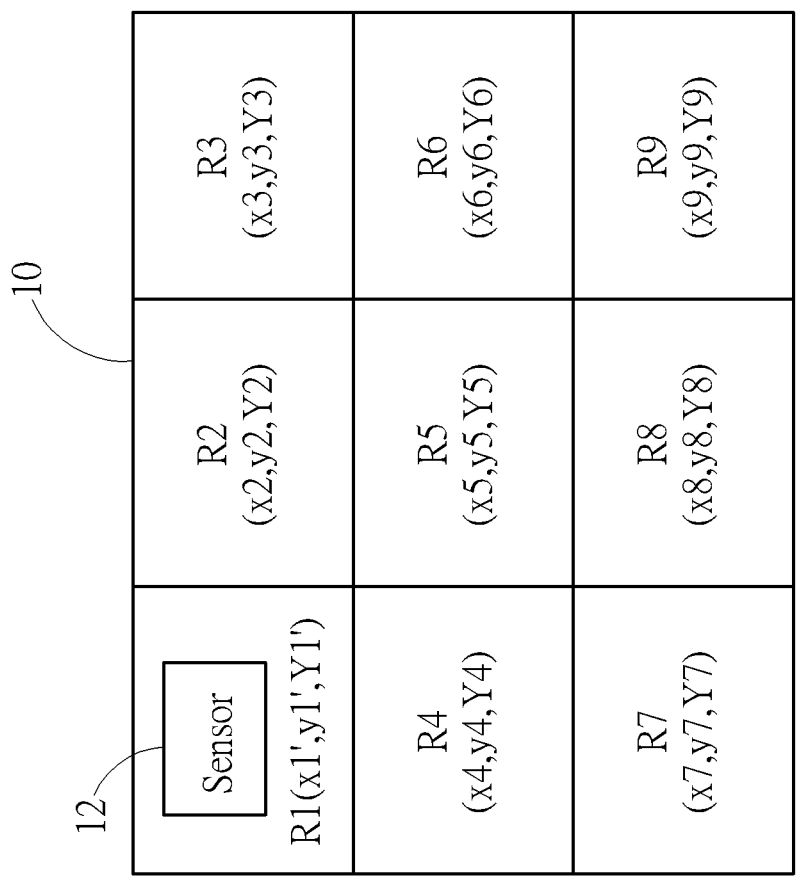
FIG. 4 is an illustration of sensing a darkest region of the screen by the sensor according to a full screen image of the screen calibration system in FIG. 1.

FIG. 4 is an illustration of sensing a darkest region of the screen 10 by the sensor 12 according to the full screen image of the screen calibration system 100. As previously mentioned, the image optical data of the region R1 to the image optical data of the region R9 can be denoted as (x1,y1,Y1) to (x9,y9,Y9). Then, the processor 13 can determine the darkest region of the screen 10 according to the image optical data (x1,y1,Y1) to (x9,y9,Y9). In the embodiment, the darkest region of the screen 10 is the region R1. In the following, the sensor 12 can be moved close to the screen 10 for acquiring first optical data of the region R1. Here, the "first optical data" can include optical characteristics of the region R1 without introducing the ambient light signal. Therefore, the first optical data can be equivalent to real luminous characteristics of the region R1. In other words, according to aforementioned definition, the first optical data of the region R1 can be written as (x1',y1',Y1') and can be acquired by using the sensor 12.

FIG. 5 is an illustration of calibrating the darkest region (i.e., R1) of the screen and estimating real luminous characteristics of other regions (i.e., R2 to R9) by the processor 13 of the screen calibration system 100. In previous step, the first optical data (x1',y1',Y1') of the region R1 can be acquired by using the sensor 12. The first optical data (x1',y1',Y1') can include the optical characteristics of the region R1 without introducing the ambient light signal. Further, in the full screen image captured by the camera 11, the image optical data of the region R1 on the screen 10 can be written as (x1,y1,Y1), which can be further expressed as (x1,y1,Y1)=(x1'+Δx1,y1'+Δy1,Y1'+ΔY1). Therefore, since the first optical data (x1',y1',Y1') can be acquired by the sensor 12, the first optical data (x1',y1',Y1') can include detectable (or say, deterministic) CIE parameters. Similarly, the image optical data (x1,y1,Y1) can be extracted from the full screen image acquired by the camera 11, the image optical data (x1,y1,Y1) can include deterministic CIE parameters. Therefore, for the region R1, a set of ambient light parameters (Δx1,Δy1,ΔY1) can be derived according to the full screen image and the first optical data (x1',y1',Y1'), as $$(\Delta x1, \Delta y1, \Delta Y1) = (x1 - x1', y1 - y1', Y1 - Y1').$$

Further, the processor 13 can generate first calibration parameters $f_{R1}$ ($x_{R1}, y_{R1}, Y_{R1}$) according to the first optical data (x1',y1',Y1') of the region R1 and target optical data (x,y,Y) set by the user. In other words, for the region R1, a correlation of the target optical data (x,y,Y), the first optical data (x1',y1',Y1'), and the first calibration parameters $f_{R1}$ ($x_{R1}, y_{R1}, Y_{R1}$) can be written as $$(x,y,Y) = f_{R1}(x1', y1', Y1').$$

Here, $f_{R1}$ ($x_{R1}, y_{R1}, Y_{R1}$) can be a transfer function, a recursive function, any color projecting function or matrix. For example, when $f_{R1}$ ($x_{R1}, y_{R1}, Y_{R1}$) is a gain matrix $G1_{RGB}$, the target optical data (x,y,Y) and the first optical data (x1',y1',Y1') can be two vectors, written as $$\begin{bmatrix} x \\ y \\ Y \end{bmatrix} = G1_{RGB} \begin{bmatrix} x1' \\ y1' \\ Y1' \end{bmatrix}.$$

The first optical data (x1',y1',Y1') can be converted to the target optical data (x,y,Y) recursively. For example, after several recursive loops are performed, values of the first optical data (x1',y1',Y1') can be gradually shifted and converged to values of the target optical data (x,y,Y). Any reasonable color coordinates or color space conversion method falls into the present invention. Further, as previously mentioned, in the full screen image captured by the camera 11, image optical data of the region R2 on the screen 10 can be written as (x2,y2,Y2). Since the ambient light signal is introduced, the image optical data (x2,y2,Y2) of the region R2 can be expressed as (x2,y2,Y2)=(x2'+Δx2,y2'+Δy2,Y2'+ΔY2). In the embodiment, since only the ambient light parameters (Δx1,Δy1,ΔY1) of the region R1 can be accurately derived according to the "deterministic" data (x1',y1',Y1') and (x1,y1,Y1), the processor 13 can generate second optical data of the second region R2 of the screen 10 according to the full screen image and the first optical data of the first region R1. Specifically, the second optical data of the second region R2 can include estimated CIE values of real luminous characteristics of the second region R2, written as $$(x2', y2', Y2') \approx (x2 - \Delta x1, y2 - \Delta y1, Y2 - \Delta Y1).$$

Here, the second optical data of the second region R2 can be written in mathematical approach, as (x2−Δx1,y2−Δy1,Y2−ΔY1). The second optical data can include estimated CIE values of real luminous characteristics of the second region R2, as illustrated below. As previously mentioned, the optical data corresponding to real luminous characteristics of the second region R2 can be written as $$(x2', y2', Y2') = (x2 - \Delta x2, y2 - \Delta y2, Y2 - \Delta Y2).$$

Since only the real luminous characteristics of the region R1 is detected by the sensor 12, the processor 13 can replace the ambient light parameters (Δx2,Δy2,ΔY2) with the ambient light parameters (Δx1,Δy1,ΔY1) for estimating the real luminous characteristics of the second region R2. In other words, when the ambient light parameters (Δx2,Δy2,ΔY2) of the region R2 is substantially equal to the ambient light parameters (Δx1,Δy1,ΔY1) of the region R1. The second optical data of the second region R2 (i.e., in mathematical form of (x2−Δx1,y2−Δy1,Y2−ΔY1)) can be substantially equivalent to the real luminous characteristics (x2',y2',Y2') of the region R2. In the following, the processor 13 can generate second calibration parameters $f_{R2}$ ($x_{R2}, y_{R2}, Y_{R2}$) according to the target optical data (x,y,Y) and the second optical data (x2−Δx1,y2−Δy1,Y2−ΔY1). In other words, for the region R2, a correlation of the target optical data (x,y,Y), the second optical data (x2−Δx1,y2−Δy1,Y2−ΔY1), and the second calibration parameters $f_{R2}$ ($x_{R2}, y_{R2}, Y_{R2}$) can be written as $$(x,y,Y) = f_{R2}(x2 - \Delta x1, y2 - \Delta y1, Y2 - \Delta Y1).$$

Here, $f_{R2}$ ($x_{R2}, y_{R2}, Y_{R2}$) can be a transfer function, a recursive function, any color projecting function or matrix. For example, when $f_{R2}$ ($x_{R2}, y_{R2}, Y_{R2}$) is a gain matrix $G2_{RGB}$, the target optical data (x,y,Y) and the second optical data (x2−Δx1,y2−Δy1,Y2−ΔY1) can be two vectors, written as $$\begin{bmatrix} x \\ y \\ Y \end{bmatrix} = G2_{RGB} \begin{bmatrix} x2 - \Delta x1 \\ y2 - \Delta y1 \\ Y2 - \Delta Y1 \end{bmatrix}.$$

As previously mentioned, for the region R2, the second optical data (x2−Δx1,y2−Δy1,Y2−ΔY1) includes the estimated CIE values to approach real luminous characteristics (x2',y2',Y2'). Therefore, after the gain matrix $G2_{RGB}$ is introduced for adjusting the real luminous characteristics (x2',y2',Y2'), colors of the second region R2 can be calibrated to approach the target optical data (x,y,Y), as $$\begin{bmatrix} x \\ y \\ Y \end{bmatrix} \approx G2_{RGB} \begin{bmatrix} x2' \\ y2' \\ Y2' \end{bmatrix}.$$

Briefly, in the screen calibration system 100, the real luminous characteristics of the region R1 can be compensated by using the first calibration parameters $f_{R1}$ ($x_{R1}, y_{R1}, Y_{R1}$) in order to calibrate colors of the region R1 to approach the target optical data (x,y,Y). Similarly, the real luminous characteristics of the region R2 can be compensated by using the second calibration parameters $f_{R2}$ ($x_{R2}, y_{R2}, Y_{R2}$) in order to calibrate colors of the region R2 to approach the target optical data (x,y,Y). Further, other regions of the screen 10 of the screen calibration system 100 can use the similar method for calibrating colors. Finally, colors of all regions R1 to R9 of the screen 10 can be calibrated to approach the target optical data (x,y,Y).

FIG. 6 is an illustration of calibrating other regions of the screen 10 by the processor 13 of the screen calibration system 100 after the darkest region R1 is calibrated. As previously mentioned, since the processor 13 can accurately generate the ambient light parameters ($\Delta x1, \Delta y1, \Delta Y1$) of the region R1 by using the camera 11 and the sensor 12, the real luminous characteristics of the region R1 can be accurately compensated by using the first calibration parameters $f_{R1}$ ($x_{R1}, y_{R1}, Y_{R1}$) in order to calibrate colors of the region R1 to approach the target optical data (x,y,Y). For other regions of the screen 10, real luminous characteristics of other regions can be "estimated" by the processor 13 according to the ambient light parameters ($\Delta x1, \Delta y1, \Delta Y1$) of the region R1 and the full screen image captured by the camera 11. Then, colors of other regions can be calibrated to approach the target optical data (i.e., or say, calibrated with tolerable color offsets) by using corresponding calibration parameters. In other words, under slight fluctuations of the ambient light signals, the displayed image of the screen 10 is consistent with the target optical data (x,y,Y). Further, in the screen calibration system 100, the processor 13 can generate a plurality of testing patterns on the screen 10 according to the target optical data. The screen 10 can display the plurality of testing patterns for calibrating image colors. When the target optical data (x,y,Y) is supported by the darkest region R1 of the screen 10, it implies that the target optical data (x,y,Y) can be supported by all regions of the screen 10. The reason is illustrated below. The real luminous characteristics of the darkest region R1 can be compensated by using the first calibration parameters $f_{R1}$ ($x_{R1}, y_{R1}, Y_{R1}$) with large compensating gains in order to approach the target optical data (x,y,Y). Therefore, since the first calibration parameters $f_{R1}$ ($x_{R1}, y_{R1}, Y_{R1}$) with large compensating gains can be used for compensating the real luminous characteristics of the darkest region R1 to approach the target optical data (x,y,Y), necessarily, the second calibration parameters $f_{R2}$ ($x_{R2}, y_{R2}, Y_{R2}$) with small compensating gains can be used for compensating the real luminous characteristics of other region (i.e., the region R2) to approach the target optical data (x,y,Y). In other words, when the darkest region R1 of the screen 10 is regarded as a reference region and successfully compensated, the target optical data (x,y,Y) can be supported by all regions of the screen 10. However, the sensor 12 of the present invention is not limited to detecting the darkest region R1 of the screen 10. For example, the sensor 12 can be used for detecting a user-defined region, as illustrated below.

Figure 7:
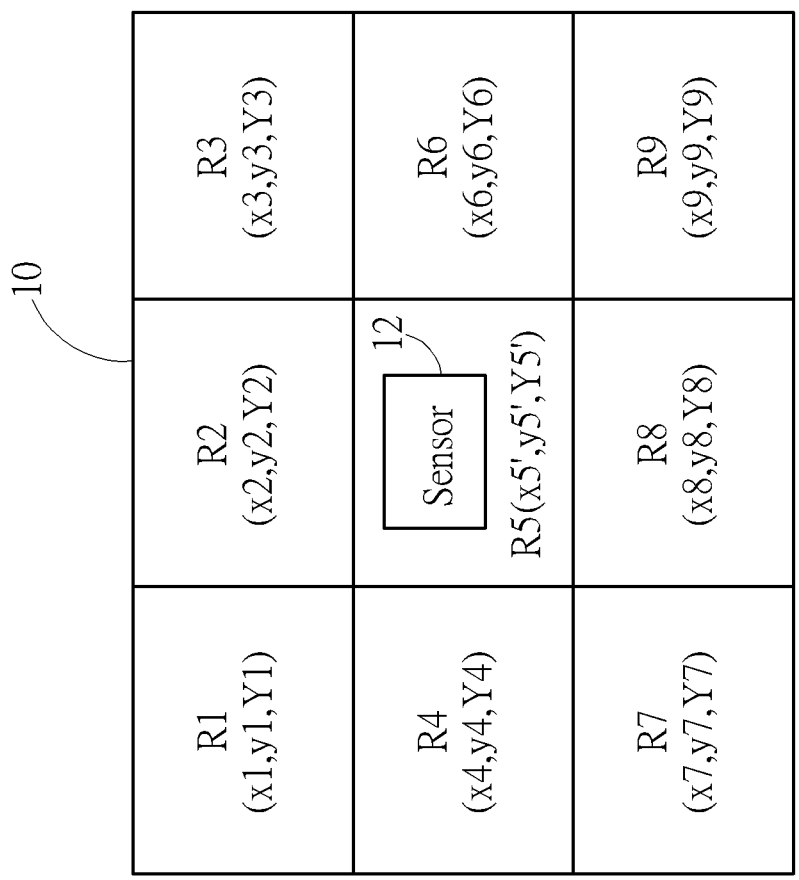
FIG. 7 is an illustration of sensing a center region of the screen by the sensor of the screen calibration system in FIG. 1.

FIG. 7 is an illustration of sensing a center region of the screen 10 by the sensor 12 of the screen calibration system 100. Here, the sensor 12 can acquire first optical data of the center region (hereafter, say "region R5") of the screen 10. Since the region R5 is located on a center position of the screen 10, the sensor 12 can directly get close to the region R5 of the screen 10 for acquiring the first optical data. In other words, in the embodiment, the sensor 12 can acquire the first optical data of the region R5 of the screen 10 before the camera 11 acquires the full screen image displayed on the screen 10. Therefore, the user can take the sensor 12 to approach the center position of the screen 10 (i.e., region R5) without determining a darkest region of the screen according to the full screen image. Here, the "first optical data" is defined as optical data of a region acquired by the sensor 12 close to the region. In the aforementioned embodiment, the sensor 12 can acquire the first optical data of the darkest region R1 of the screen 10. In the embodiment, the sensor 12 can acquire the first optical data of the region R5 on the center position of the screen 10. Therefore, in the embodiment, the "first optical data" corresponds to real luminous characteristics of the region R5 without introducing ambient light signal interference, denoted as (x5',y5',Y5'). Similarly, in the full screen image captured by the camera 11, image optical data of a region R2 on the screen 10 can be written as (x2,y2,Y2). Further, the image optical data (x2,y2,Y2) can be expressed as:

$$(x2,y2,Y2)=(x2'+\Delta x2, y2'+\Delta y2, Y2'+\Delta Y2).$$

Here, (x2',y2',Y2') are denoted as real luminous characteristics of the region R2. ($\Delta x2, \Delta y2, \Delta Y2$) are denoted as ambient light parameters of the region R2. In other words, image optical data (x2,y2,Y2) of the region R2 acquired by the camera 11 can be regarded as a combination of the real luminous characteristics (x2',y2',Y2') with the ambient light parameters ($\Delta x2, \Delta y2, \Delta Y2$). Similarly, the image optical data of the region R5 on the screen 10 can be written as (x5,y5,Y5). Further, the image optical data (x5,y5,Y5) can be expressed as:

$$(x5,y5,Y5)=(x5'+\Delta x5, y5'+\Delta y5, Y5'+\Delta Y5).$$

Here, (x5',y5',Y5') are denoted as real luminous characteristics of the region R5. ($\Delta x5, \Delta y5, \Delta Y5$) are denoted as ambient light parameters of the region R5. In other words, the image optical data (x5,y5,Y5) of the region R5 acquired by the camera 11 can be regarded as a combination of the real luminous characteristics (x5',y5',Y5') with the ambient light parameters ($\Delta x5, \Delta y5, \Delta Y5$), and so on. After the ambient light signal is introduced, image optical data of the region R1 to optical data of the region R9 can be denoted as (x1,y1,Y1) to (x9,y9,Y9). Particularly, the first optical data of the region R5 can be written as (x5',y5',Y5') and can be acquired by using the sensor 12 since the sensor 12 is close to the region R5.

FIG. 8 is an illustration of calibrating the center region of the screen 10 and estimating real luminous characteristics of other regions by the processor 13 of the screen calibration system 100. In previous step, the first optical data (x5',y5',Y5') of the region R5 can be acquired by using the sensor 12. As previous definition, in the full screen image captured by the camera 11, image optical data of the region R5 on the screen 10 can be written as (x5,y5,Y5)=(x5'+$\Delta$x5,y5'+$\Delta$y5, Y5'+ΔY5). Therefore, since the first optical data (x5',y5',Y5') of the region R5 can be acquired by the sensor 12, the first optical data (x5',y5',Y5') can include detectable (or say, deterministic) CIE parameters. Therefore, for the region R5, a set of ambient light parameters (Δx5,Δy5,ΔY5) can be acquired according to the full screen image and the first optical data (x5',y5',Y5'), as (Δx5,Δy5,ΔY5)=(x5−x5',y5−y5',Y5−Y5').

Further, the processor 13 can generate calibration parameters $f_{R5}$ ($x_{R5}, y_{R5}, Y_{R5}$) according to the first optical data (x5',y5',Y5') of the region R5 and target optical data (x,y,Y) set by the user. In other words, for the region R5, a correlation of the target optical data (x,y,Y), the first optical data (x5',y5',Y5'), and the first calibration parameters $f_{R5}$ ($x_{R5}, y_{R5}, Y_{R5}$) can be written as (x,y,Y)=$f_{R5}$(x5',y5').

Here, $f_{R5}$ ($x_{R5}, y_{R5}, Y_{R5}$) can be a transfer function, a recursive function, any color projecting function or matrix. For example, when $f_{125}$ ($x_{R5}, y_{R5}, Y_{R5}$) is a gain matrix $G5_{RGB}$, the target optical data (x,y,Y) and the first optical data (x5',y5',Y5') can be two vectors, written as $$\begin{bmatrix} x \\ y \\ Y \end{bmatrix} = G5_{RGB} \begin{bmatrix} x5' \\ y5' \\ Y5' \end{bmatrix}.$$

The first optical data (x5',y5',Y5') can be converted to the target optical data (x,y,Y) recursively. For example, after several recursive loops are performed, values of the first optical data (x5',y5',Y5') can be gradually shifted and converged to values of the target optical data (x,y,Y). Any reasonable color coordinates or color space conversion method falls into the present invention. In FIG. 8, colors of the region R5 can be calibrated to approach target optical data (x,y,Y). Further, as previously mentioned, in the full screen image captured by the camera 11, image optical data of the region R2 on the screen 10 can be written as (x2,y2,Y2). Since the ambient light signal is introduced, the image optical data (x2,y2,Y2) of the region R2 can be expressed as (x2,y2,Y2)=(x2'+Δx2,y2'+Δy2,Y2'+ΔY2). In the embodiment, since only the ambient light parameters (Δx5,Δy5,ΔY5) of the region R5 can be accurately derived, the processor 13 can generate second optical data of the second region R2 of the screen 10 according to the full screen image and the first optical data. Specifically, the second optical data of the second region R2 can include estimated CIE values of real luminous characteristics of the second region R2, written as (x2',y2',Y2')≈(x2−Δx5,y2−Δy5,Y2−ΔY5).

Here, the second optical data of the second region R2 can be written in a mathematical form, as (x2−Δx5,y2−Δy5,Y2−ΔY5). The second optical data can include estimated CIE values of real luminous characteristics of the second region R2, as illustrated below. As previously mentioned, the optical data corresponding to real luminous characteristics of the second region R2 can be written as (x2',y2',Y2')=(x2−Δx2,y2−Δy2,Y2−ΔY2).

Since only the real luminous characteristics of the region R5 is detected by the sensor 12, the processor 13 can replace the ambient light parameters (Δx2,Δy2,ΔY2) with the ambient light parameters (Δx5,Δy5,ΔY5) for estimating the real luminous characteristics of the second region R5. In other words, when the ambient light parameters (Δx2,Δy2,ΔY2) of the region R2 is substantially equal to the ambient light parameters (Δx5,Δy5,ΔY5) of the region R5. The second optical data of the second region R2 (i.e., in mathematical form of (x2−Δx5,y2−Δy5,Y2−ΔY5)) can be substantially equivalent to the real luminous characteristics (x2',y2',Y2') of the region R2. In the following, the processor 13 can generate second calibration parameters $f_{R2}$ ($x_{R2}, y_{R2}, Y_{R2}$) according to the target optical data (x,y,Y) and the second optical data (x2−Δx5,y2−Δy5,Y2−ΔY5). In other words, for the region R2, a correlation of the target optical data (x,y,Y), the second optical data (x2−Δx5,y2−Δy5,Y2−ΔY5), and the second calibration parameters $f_{R2}$ ($x_{R2}, y_{R2}, Y_{R2}$) can be written as (x,y,Y)=$f_{R2}$(x2−Δx5,y2−Δy5,Y2−ΔY5).

Here, $f_{R2}$ ($x_{R2}, y_{R2}, Y_{R2}$) can be a transfer function, a recursive function, any color projecting function or matrix. For example, when $f_{R2}$ ($x_{R2}, y_{R2}, Y_{R2}$) is a gain matrix $G2_{RGB}$, the target optical data (x,y,Y) and the second optical data (x2−Δx5,y2−Δy5,Y2−ΔY5) can be two vectors, written as $$\begin{bmatrix} x \\ y \\ Y \end{bmatrix} = G2_{RGB} \begin{bmatrix} x2 - \Delta x5 \\ y2 - \Delta y5 \\ Y2 - \Delta Y5 \end{bmatrix}.$$

As previously mentioned, for the region R2, the second optical data (x2−Δx5,y2−Δy5,Y2−ΔY5) includes the estimated CIE values to approach real luminous characteristics (x2',y2',Y2'). Therefore, after the gain matrix $G2_{RGB}$ is introduced for adjusting the real luminous characteristics (x2',y2',Y2'), colors of the second region R2 can be calibrated to approach the target optical data (x,y,Y), as $$\begin{bmatrix} x \\ y \\ Y \end{bmatrix} \approx G2_{RGB} \begin{bmatrix} x2' \\ y2' \\ Y2' \end{bmatrix}.$$

Briefly, in the embodiment, the real luminous characteristics of the region R5 can be compensated in order to calibrate colors of the region R5 to approach the target optical data (x,y,Y). Similarly, the real luminous characteristics of the region R2 can be compensated in order to calibrate colors of the region R2 to approach the target optical data (x,y,Y). Further, other regions of the screen 10 of the screen calibration system 100 can use the similar method for calibrating colors. Finally, colors of all regions R1 to R9 of the screen 10 can be calibrated to approach the target optical data (x,y,Y).

FIG. 9 is an illustration of calibrating other regions of the screen 10 by the processor 13 of the screen calibration system 100 after the center region R5 is calibrated. As previously mentioned, since the processor 13 can accurately generate the ambient light parameters (Δx5,Δy5,ΔY5) of the region R5 by using the camera 11 and the sensor 12, the real luminous characteristics of the region R5 can be accurately compensated in order to calibrate colors of the region R5 to approach the target optical data (x,y,Y). For other regions of the screen 10, real luminous characteristics of other regions can be "estimated" by the processor 13 according to the ambient light parameters (Δx5, Δy5, ΔY5) of the region R1 and the full screen image captured by the camera 11. Then, colors of other regions can be calibrated to approach the target optical data (i.e., or say, calibrated with tolerable color offsets) by using corresponding calibration parameters. In other words, under slight fluctuations of the ambient light signals, the displayed image of the screen 10 is consistent with the target optical data (x,y,Y). Further, the processor 13 can generate a plurality of testing patterns on the screen 10 according to the target optical data. The screen 10 can display the plurality of testing patterns for calibrating image colors. However, even if the target optical data (x,y,Y) is supported by the center region R5 of the screen 10, it cannot ensure that the target optical data (x,y,Y) is supported by all regions of the screen 10. The reason is that the center region R5 may not be the darkest region of the screen 10. Therefore, even if the real luminous characteristics of the center region R5 can be compensated by using calibration parameters $f_{R5}$ $(x_{R5}, y_{R5}, Y_{R5})$ in order to approach the target optical data (x,y,Y), other regions with lower brightness level may fail to be calibrated by using calibration parameters with large compensating gains. For example, a target optical data defined by the user can include 6500K color temperature and 230 nits (i.e., candela per square meter). However, although the region R5 located on the center position of the screen 10 can be calibrated to generate an optical signal with brightness equal to 230 nits, some regions of the screen 10 may fail to be calibrated to reach 230 nits of brightness. Therefore, to avoid non-uniform brightness distribution of the screen 10, the target optical data (x,y,Y) can be adjusted by the screen calibration system 100. For example, brightness of 230 nits of the target optical data can be decreased to 210 nits by the screen calibration system 100, thereby achieving uniform brightness distribution of the screen 10. In other words, when the plurality of testing patterns displayed on the screen 10 are inconsistent with the target optical data (x,y,Y), the processor 13 can adjust the target optical data (x,y,Y) for generating adjusted target optical data. For example, the processor 13 can adjust brightness of the target optical data (x,y,Y) for generating adjusted target optical data with a tolerable brightness offset. By doing so, colors of all regions of the screen 10 are consistence with the adjusted target optical data, thereby achieving uniform brightness distribution of the screen 10.

When the testing patterns displayed on the screen 10 are consistent with the target optical data (x,y,Y), it implies that the target optical data (x,y,Y) is compatible with the screen 10. Thus, the target optical data (x,y,Y) is fixed. Colors of all regions of the screen 10 can be calibrated to approach the target optical data (x,y,Y). Further, the first optical data acquired by the sensor 12 can be real luminous characteristics of a darkest region (i.e., the region R1) of the screen 10, or a center region (i.e., the region R5) of the screen 10. The processor 13 can generate a set of ambient light parameters according to the full screen image and the first optical data. The processor 13 can further estimate real luminous characteristics of all regions accordingly. Finally, the processor 13 can compensate colors of all regions to approach the target optical data (x,y,Y). However, the present invention is not limited to using optical information of the darkest region or the center region. For example, the first optical data can be defined as optical data of any user-defined region of the screen 10 detected by the sensor 12. Hereafter, colors of other regions can be compensated accordingly. Further, after the colors of all regions are compensated, the user can manually use the sensor 12 for detecting optical data of each region of the screen 10 for verifying optical consistency of all regions of the screen 10. Alternatively, the processor 13 can automatically detect the optical data of the each region of the screen 10 for verifying the optical consistency of all regions of the screen 10. By doing so, after a color calibration process of the screen 10 is completed, the screen 10 can display images with uniformly color distribution, leading to visual experience improvement.

Figure 10:
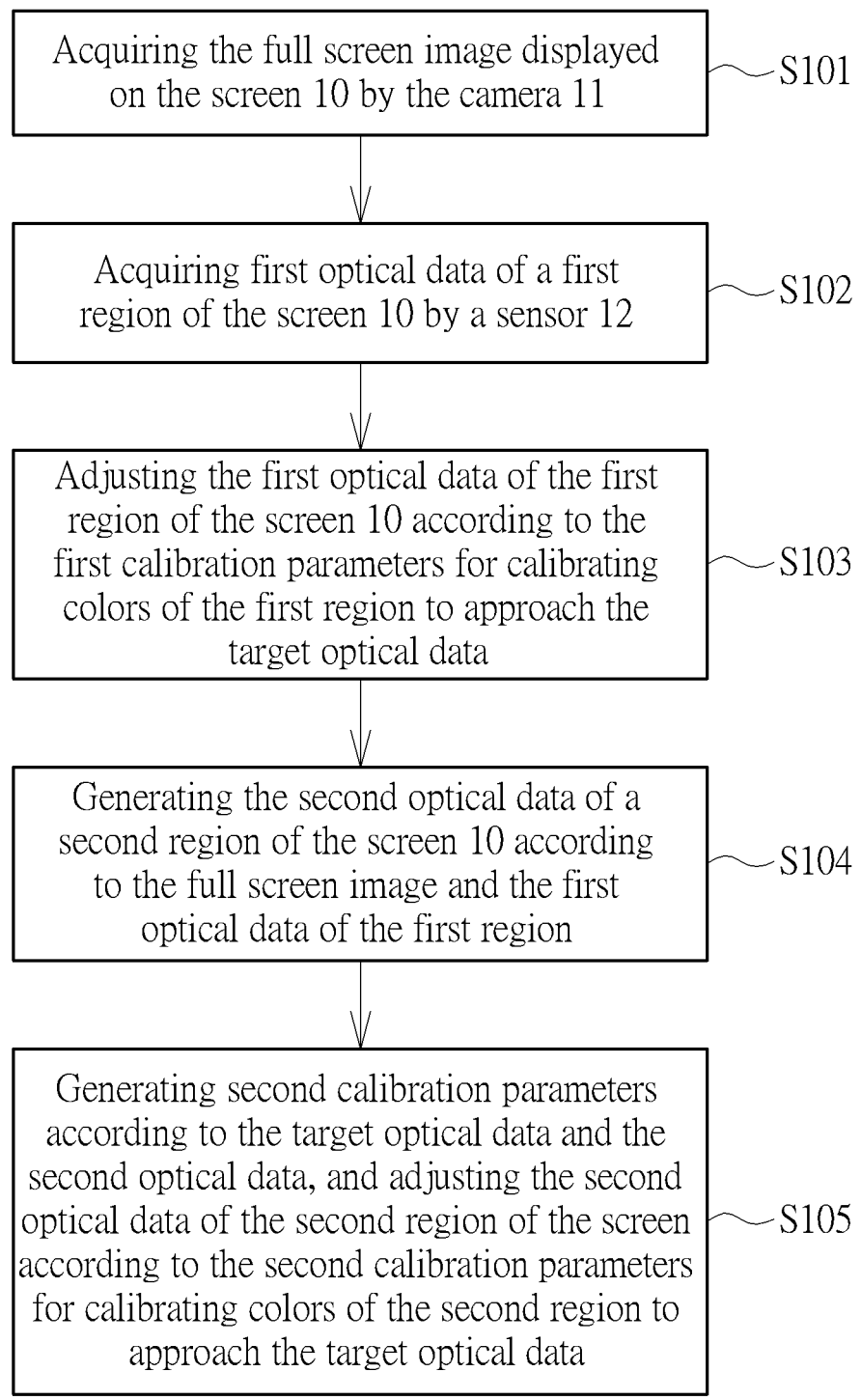
FIG. 10 is a flowchart of a screen calibration method performed by the screen calibration system in FIG. 1.

FIG. 10 is a flowchart of a screen calibration method performed by the screen calibration system 100. The screen calibration method includes step S101 to step S105. Any reasonable modification falls into the scope of the present invention. Step S101 to step S105 are written below.

step S101: acquiring the full screen image displayed on the screen 10 by the camera 11;

step S102: acquiring first optical data of a first region of the screen 10 by a sensor 12;

step S103: adjusting the first optical data of the first region of the screen 10 according to the first calibration parameters for calibrating colors of the first region to approach the target optical data;

step S104: generating the second optical data of a second region of the screen 10 according to the full screen image and the first optical data of the first region;

step S105: generating second calibration parameters according to the target optical data and the second optical data, and adjusting the second optical data of the second region of the screen according to the second calibration parameters for calibrating colors of the second region to approach the target optical data.

Operations of step S101 to step S105 are illustrated previously. Thus, they are omitted here. By using step S101 to step S105, the screen calibration system 100 can provide convenient color calibration operations and satisfactory calibration result.

To sum up, the present invention provides a screen calibration method and a screen calibration system. Instead of taking the calibrator close to all small regions of the screen in order to collect optical data, the screen calibration method only requires a full screen image captured by the camera and regional optical data of one region acquired by the sensor. The screen calibration system can generate a set of ambient light parameters and calibration parameters of the region according to the full screen image and the regional optical data. Then, the screen calibration system can gradually estimate calibration parameters of other regions. Therefore, the screen calibration system can compensate real luminous characteristics of all regions to approach the target optical data defined by the user. Thus, comparing with conventional screen calibration systems, several advantages of the screen calibration system in the present invention are introduced. First, since the sensor only requires detecting the regional optical data of the region, high repetition operations for collecting optical data of all regions can be avoided, leading to high operation efficiency. Second, since the calibration parameters of all regions can be automatically generated by the processor, alignment error or calibration offset caused by manually taking the calibrator close to all regions of the screen can also be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A screen calibration method comprising:
acquiring a full screen image displayed on a screen by a camera;

acquiring first optical data of a first region of the screen by a sensor;
adjusting the first optical data of the first region of the screen according to first calibration parameters for calibrating colors of the first region to approach target optical data;
generating second optical data of a second region of the screen according to the full screen image and the first optical data of the first region;
generating second calibration parameters according to the target optical data and the second optical data; and
adjusting the second optical data of the second region of the screen according to the second calibration parameters for calibrating colors of the second region to approach the target optical data.

2. The method of claim 1, wherein acquiring the first optical data of the first region of the screen by the sensor is acquiring the first optical data of a darkest region of the screen by the sensor according to the full screen image.

3. The method of claim 1, wherein the second optical data is substantially equivalent to real luminous characteristics of the second region, the first optical data is substantially equivalent to real luminous characteristics of the first region, and the method further comprises:
acquiring a set of ambient light parameters according to the full screen image and the first optical data.

4. The method of claim 3, wherein adjusting the second optical data of the second region of the screen according to the second calibration parameters for calibrating colors of the second region to approach the target optical data is adjusting the second optical data according to the second calibration parameters for compensating the real luminous characteristics of the second region to approach the target optical data.

5. The method of claim 1, wherein the first optical data and the second optical data belong to CIE (The International Commission on Illumination) color space data or primary color (RGB) space data.

6. The method of claim 1, wherein the first optical data of the first region of the screen is the first optical data of a center region of the screen.

7. The method of claim 6, further comprising:
setting the target optical data;
generating a plurality of testing patterns on the screen according to the target optical data; and
adjusting the target optical data to generate adjusted target optical data when the plurality of testing patterns displayed on the screen are inconsistent with the target optical data.

8. The method of claim 1, further comprising:
setting the target optical data; and
generating a plurality of testing patterns on the screen according to the target optical data;
wherein the target optical data is supported by a plurality of regions of the screen.

9. The method of claim 1, wherein the first optical data is substantially equivalent to real luminous characteristics of the first region, the second optical data is substantially equivalent to real luminous characteristics of the second region, and the camera acquires the full screen image displayed on the screen after the sensor acquires the first optical data of the first region of the screen.

10. The method of claim 1, further comprising:
detecting optical data of each region of the screen for verifying optical consistency of a plurality of regions of the screen.

11. The method of claim 1, wherein the camera, the sensor, and the screen are disposed on a display device, the camera is rotated to a front of the screen by using at least one bearing for acquiring the full screen image, the sensor is rotated to a position close to the first region of the screen by using at least one bearing for acquiring the first optical data.

12. A screen calibration system comprising:
a screen comprising a plurality of regions and configured to display an image;
a camera configured to acquire a full screen image of the screen;
a sensor close to the screen and configured to acquire first optical data of a first region of the screen; and
a processor coupled to the sensor, the camera, and the screen and configured to calibrate the screen;
wherein after the sensor acquires the first optical data of the first region of the screen, the processor adjusts the first optical data of the first region of the screen according to first calibration parameters for calibrating colors of the first region to approach target optical data, generates second optical data of a second region according to the full screen image and the first optical data of the first region, generates second calibration parameters according to the target optical data and the second optical data, and adjusts the second optical data of the second region of the screen according to the second calibration parameters for calibrating colors of the second region to approach the target optical data.

13. The system of claim 12, wherein the first region is a darkest region of the screen.

14. The system of claim 12, wherein the second optical data is substantially equivalent to real luminous characteristics of the second region, the first optical data is substantially equivalent to real luminous characteristics of the first region, and the processor acquires a set of ambient light parameters according to the full screen image and the first optical data.

15. The system of claim 14, wherein the processor generates the second calibration parameters according to the target optical data and the second optical data for compensating real luminous characteristics of the second region to approach the target optical data.

16. The system of claim 12, wherein the first region is a center region of the screen.

17. The system of claim 16, wherein the processor sets the target optical data, generates a plurality of testing patterns to the screen according to the target optical data, and adjusts the target optical data to generate adjusted target optical data when the plurality of testing patterns displayed on the screen are inconsistent with the target optical data.

18. The system of claim 16, wherein the processor sets the target optical data and generates a plurality of testing patterns to the screen according to the target optical data, and the target optical data is supported by the plurality of regions of the screen.

19. The system of claim 16, wherein the first optical data is substantially equivalent to real luminous characteristics of the first region, the second optical data is substantially equivalent to real luminous characteristics of the second region, and the camera acquires the full screen image displayed on the screen after the sensor acquires the first optical data of the first region of the screen.

20. The system of claim 16, wherein optical data corresponding to each region of the screen is detected for verifying optical consistency of the plurality of regions.

* * * * *